United States Patent Office 3,218,130
Patented Nov. 16, 1965

3,218,130
METHOD OF PRODUCING MAGNESIA CLINKER USING ANHYDROUS MAGNESIUM CHLORIDE AS A MINERALIZER
Nobuo Kawai, 45 Tamagawa Noge-machi, Setagaya-ku, Tokyo, Japan, and Takeshi Otake, 10 Hon-machi, 2-chome, Shibuya-ku, Tokyo, Japan
Filed Feb. 13, 1962, Ser. No. 172,925
Claims priority, application Japan, Feb. 16, 1961, 36/4,685
6 Claims. (Cl. 23—201)

The present invention relates to a method of producing magnesia clinker (hereinafter called clinker) in which stable crystal of periclase is markedly grown, wherein, after calcining magnesium hydroxide (hereinafter called sea magnesia) which is easily obtainable from sea water resources, 0.3–3% anhydrous magnesium chloride is added as a mineralizer, fully mixed, and sintering is done by heating it up to over 1,500° C., as it is or after it is pelletized.

The purport of the heretofore known method of producing clinker from sea magnesia is to add a few percent of a mineralizer to sea magnesia and to heat it up to over 1,750° C. with the purpose of attempting to lower the sintering temperature of sea magnesia and to make stable crystal of periclase grow. As a mineralizer, pulverized iron oxide, silica, boric oxide, etc., or a saturated solution of magnesium chloride, etc., is used individually or mixed together. Though these mineralizers are used, it is still necessary to provide a high temperature of over 1,750° C., and consequently, this method causes an enormous consumption of fuel, as well as a marked loss of refractory brick. Therefore, it has become the object of research to try to lower the heating temperature. If the heating temperature can be lowered at least to less than 1,700° C., not only would it mean the economizing of heat, but also a marked lengthening of the life of the furnace. The growth of stable crystal of periclase can not be expected merely by the lowering of the heating temperature.

It is one object of the present invention to provide a method of producing clinker by adding a mineralizer thereto with the purpose of accelerating the sintering of sea magnesia, as well as contemplating the growth of stable crystal of periclase. The mineralizer has an anhydrous magnesium chloride as its main component, which contains a small quantity of metallic magnesium. To begin with, after sea magnesia is calcined at over 600° C., 0.3–3% of the aforementioned mineralizer is added and is fully mixed; then, when it is heated up to over 1,500° C. as it is in the form of powder or after it is pelletized by pressing, the sea magnesia can be transformed into sintered clinker, the water adsorption rate of which is low and in which the crystal of periclase has markedly grown.

The method of using magnesium chloride as a mineralizer, which has heretofore been considered, was to dissolve chloride, $MgCl_2 \cdot 6H_2O$, in water, and after being formed to a saturated solution, a few percent thereof are added to the sea magnesia. In this case, at the time of the heating after this addition has been made, water contained in the sea magnesia escapes, in accordance with the rise of the temperature, and on the other hand, the chloride is gradually decomposed and at a temperature of over 520° C. the added chloride reacts upon the water, forming hydrochloric acid and then escapes by volatilization. This change can be indicated in the following:

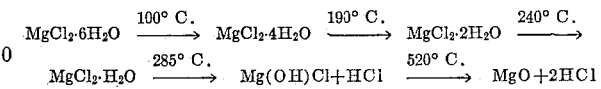

$$MgCl_2 \cdot 6H_2O \xrightarrow{100°\,C.} MgCl_2 \cdot 4H_2O \xrightarrow{190°\,C.} MgCl_2 \cdot 2H_2O \xrightarrow{240°\,C.}$$
$$MgCl_2 \cdot H_2O \xrightarrow{285°\,C.} Mg(OH)Cl + HCl \xrightarrow{520°\,C.} MgO + 2HCl$$

The above reaction is the result of the study made by Wehner, G. (Z. für Anorg. und Allg. Chem. Bd. 272, 201, 1953), and merely shows pyrolysis by heating the marketed magnesium chloride $MgCl_2 \cdot 6H_2O$, but actually in case the saturated solution is added, more water enters in the magnesium chloride, so that the decomposition of its chloride becomes easy.

Consequently, the added chloride disappears, and the effect of mineralizing operation by the chloride is lost. In addition, the decomposition and escape result in deteriorating the density by burning of the clinker and shows up in the increase of pores. Therefore, the present invention is designed in such manner that anhydrous magnesium chloride is added to calcined magnesia, so as to eliminate the defect caused by the escape of chloride owing to the existence of water. By doing this, the steam pressure of magnesium chloride becomes high at over 1,500° C., while there is no volatile component at a low temperature, and an effective mineralizing operation can be fully performed at the time of the volatilization. In addition, the existence of a small quantity of metallic magnesium in a mineralizer puts magnesia into an unstable reducing condition, so that the existence is supposed to become an accelerant for the mineralizing operation. 0.3–3% has been set as the most suitable quantity of anhydrous magnesium chloride to be added. In case less than 0.3% is added, it is difficult to obtain a satisfactory effect, and in case of more than 3% of anhydrous magnesium chloride is added, it is unfit for practical use because anhydrous magnesium chloride has at such a percentage the influence of increasing pores rather than that of the sintering of sea magnesia. In case the heating temperature is under 1,500° C., sintering cannot be as sufficient.

With this and other objects in view, which will be apparent in the following detailed description, the present invention will be clearly understood in connection with the accompanying drawing, in which.

Figure 1:
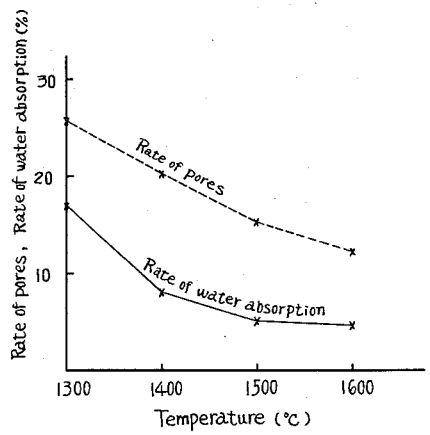
FIGURE 1 is a diagram depicting the rate of pores and of water absorption of simple sea magnesia.
Figure 2:
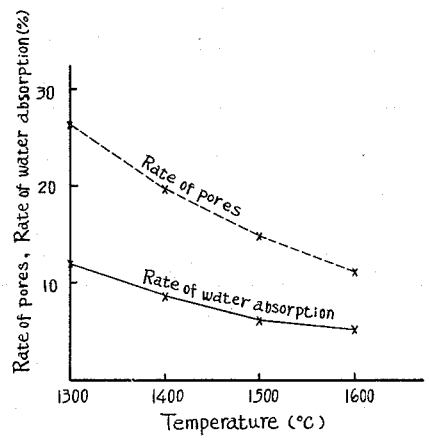
FIG. 2 is a similar diagram in connection with calcined sea magnesia.
Figure 4:
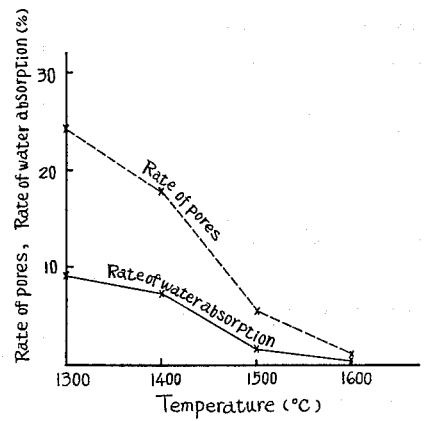
Figure 3:
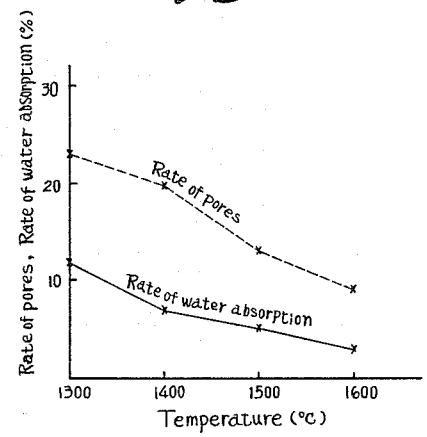

FIG. 3 is a similar diagram in connection with sea magnesia to which 3% marketed magnesium chloride has been added; and FIG. 4 is a similar diagram depicting the change of the rate of pores and that of the rate of water absorption in case the product pelletized by pressure, which is produced by adding 1% magnesium chloride anhydride to sea magnesia, has been heated at 1,300° C.–1,600° C. The pelletizing pressure of the pelletized product is 1 ton/cm.² for a pellet size of 20 mm. x 10 mm. As for the result of this, the lowering of the rate of pores and water absorption has been found in accordance with the rise of the heating temperature, as clearly shown in the drawing, a very remarkable lowering is not found in FIGS. 1–3. On the contrary, in case of the product to which anhydrous magnesium chloride is added, the sudden lowering of the rate of pores and water absorption has been found at 1,400° C.–1,500° C. and in this case it is also found that sintering has been accelerated very remarkably at a temperature above 1,500° C.

An example of the present invention will be given as follows:

200 g. of sea magnesia is collected, and is made into calcined sea magnesia by heating at 900° C. in an electric furnace. 100 g. of calcined sea magnesia thus obtained is put into a porcelain pot mill, and after 1 g. of anhydrous magnesium chloride (1% in weight) is added to the above calcined sea magnesia, it is crushed and mixed for 10 hours by a dry process. 10 g. of this mixture is collected and is pelletized by pressing with a 2/cm. diameter cylindrical metal mold, the pelletizing pressure being 1 ton/cm.². In this case, the above process is performed rapidly because anhydrous magnesium chloride is of extremely hygroscopic nature. The materials and pelletized product are kept in glass bottles. The pelletized product is put into a platinum-rhodium electric resistance furnace, and this pelletized product in the furnace can be easily sintered, when the charging of the furnace with electric current is stopped after the temperature in the furnace is raised up to 1,600° C., so that the product can be made into clinker whose water absorption rate is zero and whose crystal of periclase, is of a size of 40–50μ.

Further, the anhydrous magnesium chloride used in the above-mentioned process can be obtained by treating 10 g. of pulverized metallic magnesium at 600° C. with 20 l. of chlorine gas for 1 hour, and the anhydrous magnesium chloride contains 20% metallic magnesium which has not reacted.

While we have disclosed one embodiment of the present invention, it is to be understood that this embodiment is given by example only and not in a limiting sense, the scope of the present invention being determined by the objects and the claims.

We claim:
1. A method of producing magnesia clinker comprising the steps of dehydrating magnesium hydroxide by calcining the same,
   adding to said calcined magnesium hydroxide between about 0.3–3.0% of anhydrous magnesium chloride, and
   sintering said mixture by heating it at temperatures from about 1,500° C. to 1,700° C.
2. The method of producing magnesia clinker, as set forth in claim 1, which includes the step of
   sintering said dry mixture at a temperature of about 1,600° C.
3. The method of producing magnesia clinker, as set forth in claim 1, which includes the step of
   adding a small quantity of metallic magnesium to said dry mixture of calcined magnesium hydroxide and anhydrous magnesium chloride.
4. The method of producing magnesia clinker, as set forth in claim 1, which includes the step of
   pelletizing said dry mixture of calcined magnesium hydroxide and anhydrous magnesium chloride before sintering.
5. The method of producing magnesia clinker, as set forth in claim 4, wherein
   said step of pelletizing is performed at a pressure of about 1,000 kg. per cm.².
6. The method of producing magnesia clinker, as set forth in claim 1, wherein said anhydrous magnesium chloride contains in admixture therewith, a small quantity of metallic magnesium.

References Cited by the Examiner
UNITED STATES PATENTS

| | | | |
|---|---|---|---|
| 1,405,388 | 2/1922 | Bassett | 23—201 |
| 1,451,540 | 4/1923 | France | 106—58 |
| 1,661,043 | 2/1928 | Koehler | 106—58 |
| 2,571,102 | 10/1951 | Austin | 106—58 |
| 2,641,532 | 6/1953 | Hicks | 23—201 |

OTHER REFERENCES

Kukolev et al.: "Making Dense Kaolin Refractories at Low Firing Temperature," Chemical Abstracts, vol. 44, 1950, page 2721.

MAURICE A. BRINDISI, *Primary Examiner.*